(12) United States Patent
Kühn et al.

(10) Patent No.: US 7,577,740 B2
(45) Date of Patent: Aug. 18, 2009

(54) SCALABLE VEHICLE PROCESSING SYSTEM

(75) Inventors: Thomas Kühn, Sarstedt (DE); Ralph Behrens, Schellerten (DE); Volker Kuz, Braunchhweig (DE)

(73) Assignee: Harman Becker Automotive Systems GmbH (DE)

( * ) Notice: Subject to any disclaimer, the term of this patent is extended or adjusted under 35 U.S.C. 154(b) by 831 days.

(21) Appl. No.: 10/841,103

(22) Filed: May 7, 2004

(65) Prior Publication Data

US 2005/0027787 A1 Feb. 3, 2005

(30) Foreign Application Priority Data

May 8, 2003 (EP) .................................. 03010420

(51) Int. Cl.
- *G06F 15/173* (2006.01)
- *G06F 15/16* (2006.01)
- *H04L 12/28* (2006.01)

(52) U.S. Cl. .................. 709/225; 709/200; 370/406
(58) Field of Classification Search .................. 709/225, 709/200; 370/406
See application file for complete search history.

(56) References Cited

U.S. PATENT DOCUMENTS

| | | | | |
|---|---|---|---|---|
| 5,805,804 A | * | 9/1998 | Laursen et al. | 709/223 |
| 6,009,456 A | * | 12/1999 | Frew et al. | 709/202 |
| 6,377,782 B1 | * | 4/2002 | Bishop et al. | 455/3.01 |
| 6,687,732 B1 | * | 2/2004 | Bector et al. | 709/200 |
| 7,012,964 B1 | * | 3/2006 | Nakano et al. | 375/240.28 |
| 7,016,369 B2 | * | 3/2006 | Andersson et al. | 370/440 |
| 7,039,643 B2 | * | 5/2006 | Sena et al. | 707/101 |
| 2002/0165912 A1 | * | 11/2002 | Wenocur et al. | 709/203 |
| 2003/0053486 A1 | * | 3/2003 | Okamori | 370/474 |
| 2003/0109271 A1 | * | 6/2003 | Lewis et al. | 455/517 |
| 2004/0203370 A1 | * | 10/2004 | Luo et al. | 455/41.2 |

FOREIGN PATENT DOCUMENTS

| | | |
|---|---|---|
| EP | 1134673 | 9/2001 |
| WO | WO 01/80002 | 10/2001 |

OTHER PUBLICATIONS

Xu, Lin et al., "DRiVE-ing to the Internet: Dynamic Radio for IP Services in Vehicular Environments", *IEEE*, 2000, pp. 281-289.

* cited by examiner

*Primary Examiner*—George C Neurauter, Jr.
*Assistant Examiner*—Mark D Fearer
(74) *Attorney, Agent, or Firm*—Brinks Hofer Gilson & Lione

(57) ABSTRACT

A vehicle processing system exchanges data through a vehicle entertainment and information system, a service gateway, and a content provider. The vehicle processing system requests data from the content provider through a service gateway. The service gateway generates and transmits a downstream service packet to the vehicle entertainment and information system. The content provider may include a packet generation subsystem that forms the downstream data packets. The subsystem may encode the data and embed a data identifier that may identify the data format of the downstream data packets.

14 Claims, 9 Drawing Sheets

SCALABLE VEHICLE PROCESSING SYSTEM

PRIORITY CLAIM

This application claims the benefit of European Application No. 3010420.2, filed May 8, 2003. The disclosure of the above application is incorporated herein by reference.

BACKGROUND OF THE INVENTION

1. Technical Field

This invention relates to a scalable vehicle processing system, and more particularly, to a scalable vehicle processing system interfaced to a vehicle entertainment system.

2. Related Art

Service providers may offer value to subscribers and generate revenues through wireless services. These services make it possible to alert customers to a location and route calls to appropriate directory services. While many wireless systems are reliable and effective when interfaced to open platforms, in certain circumstances, they are incompatible to closed platforms, which may incorporate proprietary standards.

Some proprietary standards are complex and may not be well documented. As data formats and structures change, many services and applications may need to be re-configured to new formats. These shortcomings may create errors that compromise data integrity. Therefore a need exists for a scalable interface that connects applications to content providers.

SUMMARY

This invention provides a scalable vehicle processing system that exchanges data through a vehicle entertainment and information system, a service gateway, and a content provider. The system may request data from the content provider that may encode the requested data and transmit that data to the service gateway. The service gateway generates and transmits data to the vehicle entertainment and information system.

The content provider may include a packet generation subsystem that forms downstream data. The subsystem may encode the data and embed a data identifier that identifies a data format. The content provider may include a transmitter that transmits the downstream data packet to the service gateway.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
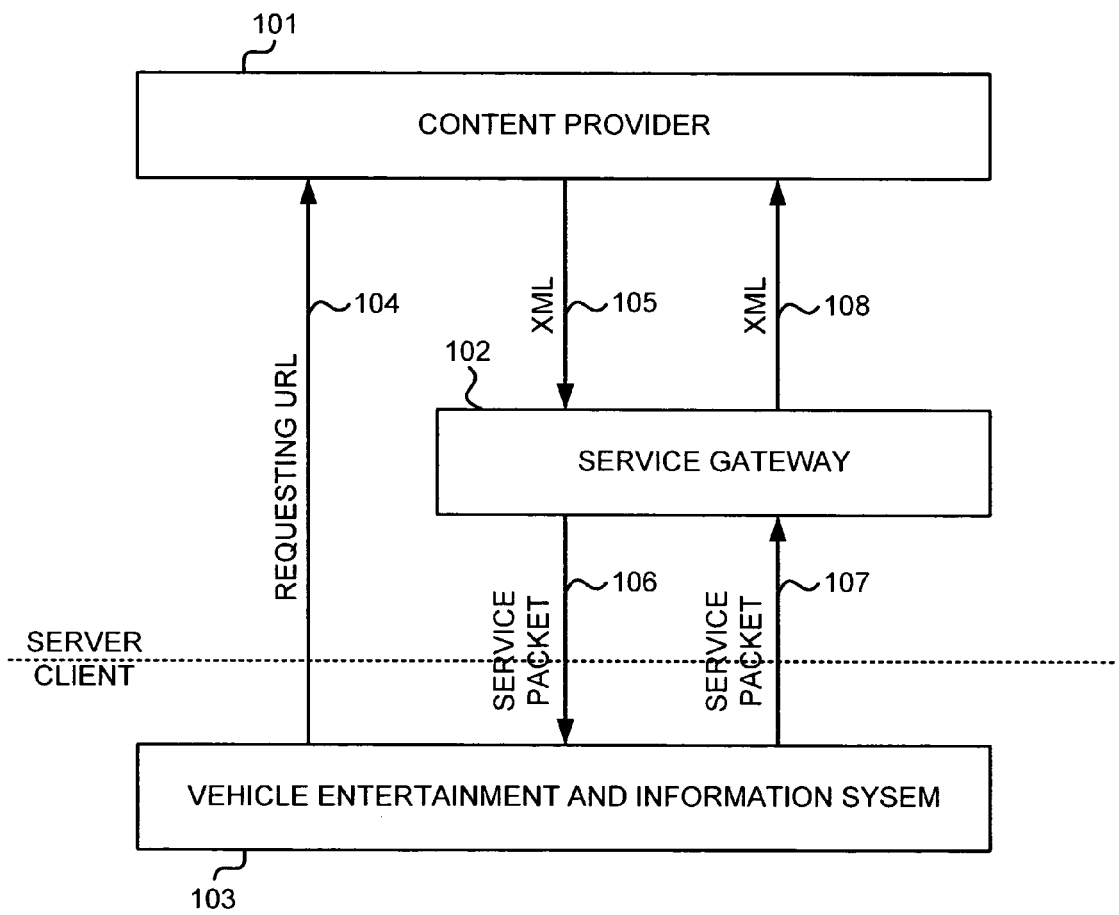
FIG. 1 is a block diagram of a scalable vehicle processing system.

A scalable vehicle processing system includes a service gateway, a content provider, and a vehicle entertainment and information system. The scalable vehicle processing system provides a concise, scalable, and flexible interface to the content provider by linking the content provider and the vehicle entertainment and information system through a service gateway. The service gateway may be controlled and documented to eliminate communication errors.

A service gateway may generate data that are delivered to a vehicle entertainment and information system in any standard protocol. Changes in communication protocols, proprietary standards, and data formats are easily accommodated without changing the interfaces that may link the service gateway to the content provider. Content and application providers may not notice protocol changes that are passed between the service gateway and the vehicle entertainment and information systems as they may be transparent.

While the vehicle processing system may accommodate many different communication protocols, to illustrate the concept of the vehicle processing system, a flexible and extensible data protocol is described. Although the systems encompass any communication protocols and languages, the following vehicle processing systems include an eXtensible Markup Language (XML) that provides a common format for the delivery of a structured data.

The vehicle processing system of FIG. 1 includes a content provider 101, a service gateway 102, and a vehicle entertainment and information system or bus 103 (hereinafter, entertainment system 103). The content provider 101 and the service gateway 102 may be linked or positioned at a server-side as shown in FIG. 1 and may be linked to the entertainment system 103 or a client side via a communication link, such as a wireless communication link that may be a GSM (General System for Mobile Communications), UMTS (Universal Mobile Telecommunications System), or any other wireless link.

The content provider 101 may provide information and services for viewing or distribution on a public, private, or semiprivate network. The network may be the Intranet, an extranet, a local area network, or any other transport platform that may link the entertainment system 103 to the content provider 101 through the service gateway 102. The transport platforms may include or support WiFi, Ultraband, WiMax, Mobile-Fi, or ZigBee mobility, or a combination thereof. Content may include video, audio, software, graphics, or any other information. The service gateway may comprise a dedicated computer with memory that connects devices or networks using many other communication protocols so that information may be passed from one device or network to another. Further, the content provider 101 may comprise a host computer with memory or an interface to a server connected to one or more databases or other entities that provide content, services, or applications.

The content provider 101 may be interfaced to a network or another device through the service gateway 102. The service gateway 102 may provide a mark up language interface to the content provider 101. This interface may be a standard XML interface. The link between the service gateway 102 and the entertainment system 103 also may use a markup language interface such as an XML interface or another standard or proprietary protocol.

In FIG. 1, the entertainment system 103 requests an address, such as a Uniform Resource Locator 104 (URL 104) for a resource on a network. The URL may specify the protocol to be used in accessing the resource and, optionally, the name of the device that the resource resides. The URL 104 may include a request for a service, an application, or data from a content provider 101. In response, the content provider 101 delivers data in a standardized format 105 to the service gateway 102. The data may be delivered in a packet format using downstream data packets. In turn, the service gateway 102, transfers the information in a form that is compatible with the entertainment system 103.

A requested service or application from the content provider 101 may require the entertainment system 103 to transmit data serially or in parallel to the content provider 101. The content provider 101 may ask or require an updated user profile on a server that causes the entertainment system 103 to form and transmit data to the content provider 101. The data may be transmitted in a packet format to the service gateway 102 that sends the data to the content provider 101. The service gateway 102 may transfer and convert the data to a form compatible with the receiving content provider 101. In FIG. 1, the data may be reformatted using a markup language 108, such as XML, which in turn is transmitted to the content provider 101.

Figure 2:
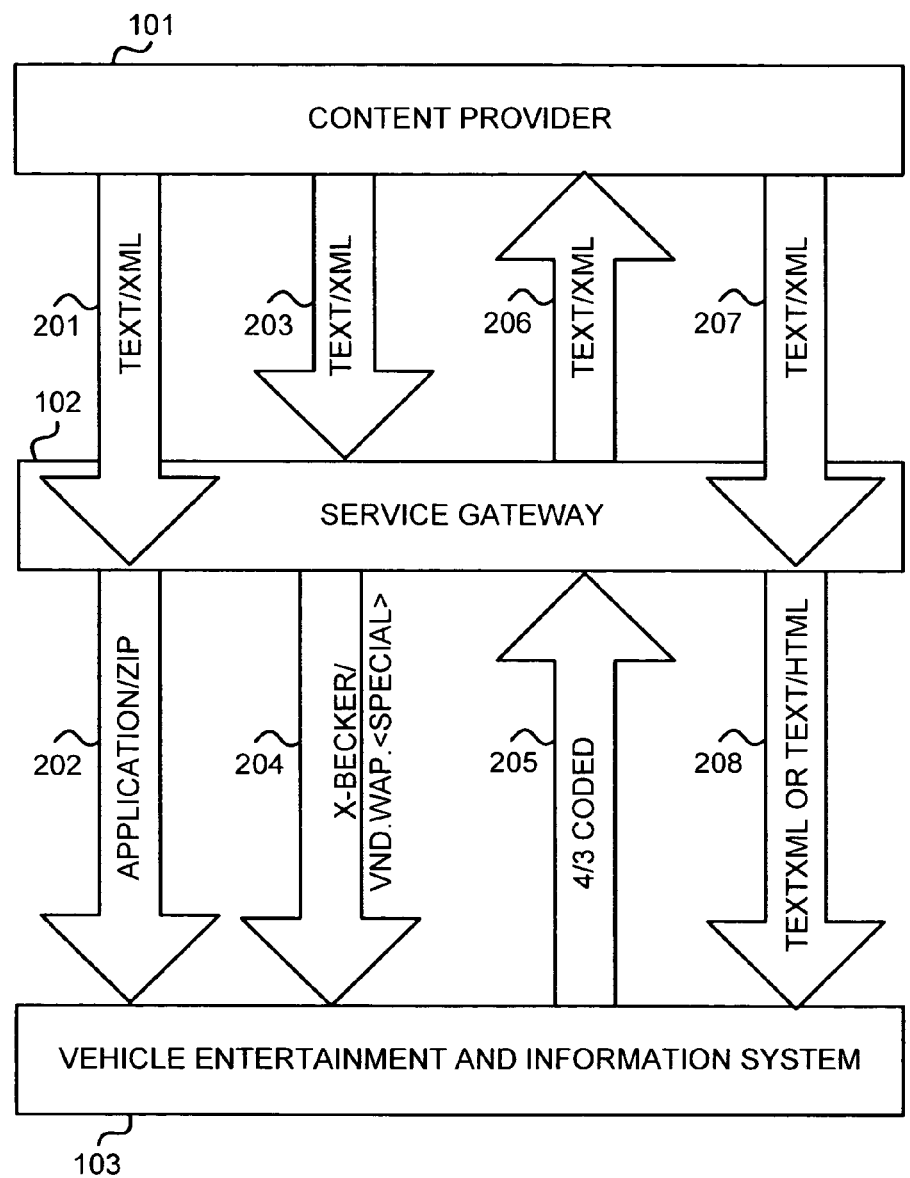
FIG. 2 is a block diagram of a data exchange of FIG. 1.

Although any communication formats may be used, FIG. 2 illustrates some of the different data formats that may be used to transmit data between the content provider 101 and the entertainment system 103. When the entertainment system 103 requests a resource such as a service or application from the content provider 101, the content provider 101 retrieves the requested resource and sends it to the service gateway 102 in a protocol that is compatible to the service gateway 102.

A markup language interface that may be a unitary part of or may be linked to the content provider 101 and the service gateway 102. When an XML interface is used in the downstream to pass data from the content provider 101 to the service gateway 102, the data may be transmitted in the following format:

```
<?xml version="1.0"?>
    <downstream>
        <mimetype>x-becker/vnd.wap.lbs</mimetype>
        <version>1.0</version>
        <entertainment system>1223434</entertainment system>
        <session>JID234323423</session>
        <responseurl>http://62.8.23'/-.44/log-Ln</responseurl>
        <!-- content of the downstream packet (service) -->
    </downstream>
```

Similarly, when data is transmitted from the service gateway 102 to the content provider 101, it may be sent under the following format:

```
<?xml version="1.0"?>
    <upstream>
        <entertainment systemid>122343535345</entertainment systemid>
        <language-id>24</language-id>
        <session>JID234323423</session>
        <!--content of the upstream packet (service)-->
    </upstream>
```

The <downstream> tag and <upstream> tag may be used to identify the packet content as transmission data from the content provider 101 to the service gateway 102 and from the service gateway 102 to the content provider 101, respectively. The <mimetype> tag may identify a MIME (Multipurpose Internet Mail Extension) type, which may define the data format used when transmitting the packet's payload from the service gateway 102 to the entertainment system 103. In FIG. 2, the <mimetype> tag may include an identifier that identifies a data format for providing the content or a service to the entertainment system 103. The identifier may be placed within, embedded, or added to <entertainment systemid> tag in the downstream format. In the upstream data, the same tag may be used to identify the sending source of the upstream service packet. In FIG. 2, the tag may allow the content provider 101 to identify the entertainment system 103 that is transmitting the upstream data.

As each entertainment system 103 may use more than a single resource such as an application or service simultaneously or separately in time, one or more sessions may be served by one or more content providers 101. When one or more sessions are served, the downstream and upstream data formats that may include a <session> tag that differentiates or identifies the sessions. A session tag may differentiate data associated with a service or content request.

In FIGS. 1 and 2, the content provider 101 may not directly reply to the entertainment system 103. Instead, the content provider 101 may send data through the service gateway 102 which also may function as a bridge. When a service gateway 102 is used, the downstream information may include <responseurl> tag that allows the receiving entertainment system 103 to associate the received data packets to a service or data request. The upstream format of the XML interface may further include a <languageid> tag that identifies the language used by the entertainment system 103.

In upstream and downstream data formats described above, the comments designated by <!--- ... --> may indicate the sections in the mark up language definitions in which the actual payload is transmitted using service and content dependent tags. In the formats above, the comments indicate the sections of XML definitions and the content dependent XML tags.

The following shows a downstream data packet in which destinations for a navigation system is downloaded from the content provider 101. In the language below, a server is providing off-board navigation services.

```
<?xml version="1.0"?>
    <downstream>
        <mimetype>x-becker/vnd.wap.lbs</minietype>
        <version>1.0</version>
        <entertainment system>1223434</entertainment system>
        <session>JID234323423</session>
        <responseurl>http://62.8.232.44/logir</responseurl>
        <navdestinations>
            <startmode>NAVISTART_IMMIDIATE</startmode>
            <savemode>DESTSAVE_NORMAL</savemode>
            <destination>
                <city>Hildesheim</city>
                <country>Germany</country>
                <street>Daimlerring</street>
                <housenumber>1</housenumber>
            </destination>
            <destination>
                <city>Karlsbad</city>
                <country>Germany</country>
                <street>Im Stockmaedle</street>
                <housenumber>1</housenumber>
```

```
        </destination>
        <destination>
            <city>Hamburg</city>
            <country>Germany</country>
            <street>Wendenstrasse</street>
            <housenumber>4</housenumber>
        </destination>
    </navdestinations>
</downstream>
```

A <navdestinations> tag indicates that the navigation destinations are provided. The <startmode> tag instructs the navigation system to navigate to one of the destinations identified in the payload. The navigation may commence immediately or may begin later in time, such as upon a user's instruction or selection. The navigation system may be connected to, or may be a unitary part of the entertainment system 103.

The <savemode> tag may notify the entertainment system 103 whether the navigation system should save the local destination information locally. If similar information has been previously stored locally, the <savemode> tag may indicate if that information should be overwritten. The <destination> tags may provide information related to the data's destination.

The XML communication links described above are flexible and capable of defining new data formats by including new tag definitions in a Document Type Definition (DTD) file or files. The DTD files may describe the meanings of tags that may be used. One benefit of using a markup language to describe the data formats is that the parsers used to analyze data structures in the content provider 101 may ignore tags they cannot interpret correctly. The service gateway 102 may not generate error if a tag is not correctly construed and thus, may not disrupt a navigation session.

Because bandwidth may be a scarce resource in some communication links such as in some wireless systems, the content provider 101 or the service gateway 102 may compress data using a tag-compression, such as, tokenizing or other methods that reduce bandwidth transmissions. When tokenizing the tags, each of the tags is replaced by a number. A static list may exist or a dynamic mapping-list may be generated and transmitted along with the tokenized payload to map each of the numbers to a tag according to interface definitions. A tokenized version of a portion of the navigation system illustrating destination information may look like:

```
<1>
    <2>
        <3>1.0</3>
        <4>1223434</4>
        <5>JID234323423</5>
        <6>http://62.8.232.44/login</6>
        <7>
            <8>NAVISTART_IMMIDIATE</8>
            <9>DESTSAVE_NORMAL</9>
            <10>
                <11>Hildesheim</11>
                <12>Germany</12>
                <13>Daimlerring</13>
                <14>1</14>
            </10>
            <10>
                <11>Karlsbad</11>
                <12>Germany</12>
                <13>Im Stockmaedle</13>
                <14>1</14>
            </10>
            <10>
                <11>Hamburg</11>
                <12>Germany</12>
                <13>Wendenstrasse</13>
                <14>4</14>
            </11>
        </7>
    </2>
```

Tokenizing of tags may be very efficient when used to compress larger blocks of data. The compression may reduce the amount of space or bandwidth needed to store or transmit the data by about 30% to about 50%. Further, a tokenized payload may be compressed using any compression algorithm including ZIP, BZIP2, TAR and other methods or algorithms that reduce the bandwidth needed to store or transmit data. The payload in XML format can also be directly compressed, without tokenizing, using one or more algorithms or methods. Other comparable data compression mechanism may be further employed for transmitting data in the upstream and for data transmission between the service gateway 102 and the entertainment system 103 just as data compression may occur exclusively at the service gateway 102 or at any combination of devices that include the content provider 101, the service gateway 102 and the entertainment system 103.

In FIG. 2, the service gateway 102 receives the downstream data from the content provider 101 in a selected format 203, for example, a text/XML format. The service gateway 102 may transmit the data in a downstream service packet using a proprietary MIME type 204 as described in <mimetype> tag of the XML Interface Specification that may be found at www.XML.com, the entire specification is incorporated in this disclosure by reference. Alternatively, the service gateway 102 may forward the downstream data in the text/HTML format 208 to the entertainment system 103, if the entertainment system 103 is capable of processing text/HTML type of information.

Each entertainment system 103 may identify the data arrangement or formats to be processed through data packets or other data formats. The notification may define all or some of the attributes of the data, including layouts and key fields. The notification also may interrupt an expected execution at a defined point to make the service gateway 102 aware of a version or a data format.

The service gateway 102 may transparently serve as a standardized interface to the content provider 101 that both transfers information and converts it to a form to compatible with the entertainment system 103. Hence, the service gateway 102 may serve as a controlling interface, which always forwards data to the entertainment systems 103 in a format that can be processed by the entertainment systems 103. Alternatively, the service gateway 102 may comprise a device that connects buses or devices that use the same or different communication protocols. In FIG. 2, the upstream data flow is shown by arrows 205 and 206. The data format of the upstream data at the interface between the service gateway 102 and the content provider 101 may also correspond to the downstream data format.

Figure 3:
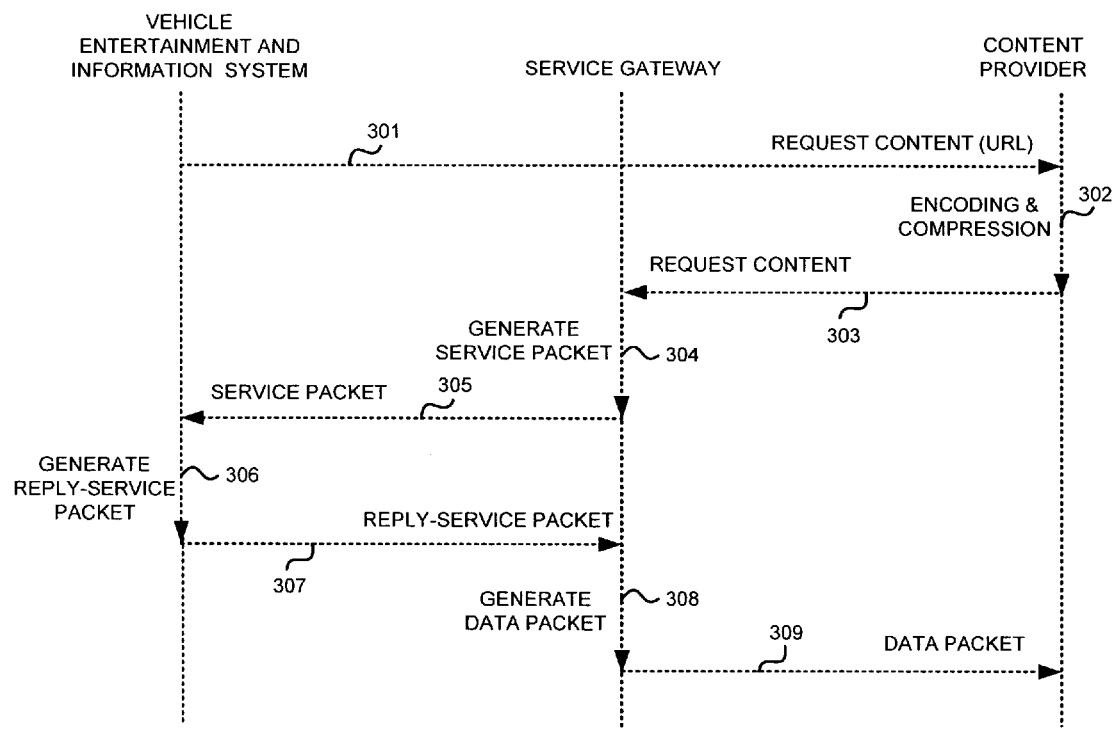
FIG. 3 is a flow diagram of FIG. 1.

FIG. 3 is a data flow diagram of the vehicle processing system of FIG. 1. At 301, the entertainment system 103 requests a service or application from the content provider 101. In response, the content provider 101 may encode the requested downstream data to a standard data format, such an XML format that is compatible with the service gateway 102. To reduce the bandwidth used in a communication link and increase efficiency, the requested data may be compressed. After a downstream data packet is formed at the content provider 101, the downstream data is transmitted to the service gateway 102 at 303. The service gateway 102 passes a downstream service packet 304 to the entertainment system 103 at 305 via a communication link, such as a wireless electrical or optical link.

The processing of the downstream data at the service gateway 102 may comprise one or more processes or acts. The service gateway 102 may first analyze the data format before deciding whether it is necessary to convert the data to another data format, such as a proprietary data format that may be used by the service gateway 102. If a conversion is necessary, the service gateway 102 may convert the data to a compatible protocol before generating or passing the data as a downstream service packet 304 to the entertainment system 103 at 305. If the entertainment system 103 is capable of processing the downstream data at 303 from the content provider 101, the service gateway 102 may decide at 304 to forward the downstream data in the same data format to the entertainment system 103. In this function, the service gateway 102 may act as a service bridge that connects the content provider 102 to the entertainment system 103 using the same communication protocol or format.

The service gateway 102 may compress the requested content at 304 before transmitting the content across a communication link. Alternatively, if the downstream data is received in a compressed format, but the data requires conversion to a protocol compatible with the entertainment system 103, the service gateway 102 may first decompress the downstream data, convert the data to a compatible protocol, and then pass the converted data to the entertainment system 103 at 305. Prior to passing the data to the entertainment system 103, the service gateway 102 may compress the data.

The entertainment system 103 may analyze the downstream service packet received at 305. If its content is conveyed in a compressed format, the entertainment system 103 may restore the content of the compressed data or file to its original form. Then the data may be analyzed before it is passed to the service requesting entity within the entertainment system 103. The requesting entity may include the navigation system, a Bluetooth compatible device, a laptop computer, a PDA, a device, another communication link, or a combination linked to the entertainment system 103.

In circumstances that require the entertainment system 103 to respond to the content provider 101, the entertainment system 103 may transmit an upstream service packet 306 to the service gateway 102 at 307. The upstream data may then be processed like the requested content delivered to the service gateway 102.

The service gateway 102 may generate at 308 and transmit an upstream data packet to the content provider 101 at 309. The data packet may comprise a compressed content of the upstream service packet prior to generating the packet, a data conversion of the upstream service packet into another data format, or a combination thereof. In some vehicle processing systems, the upstream service data may be compressed before forming data packets. The data packet generation 308 may further comprise an uncompressing of the upstream service packet prior to the data processing acts described above.

Figure 4:
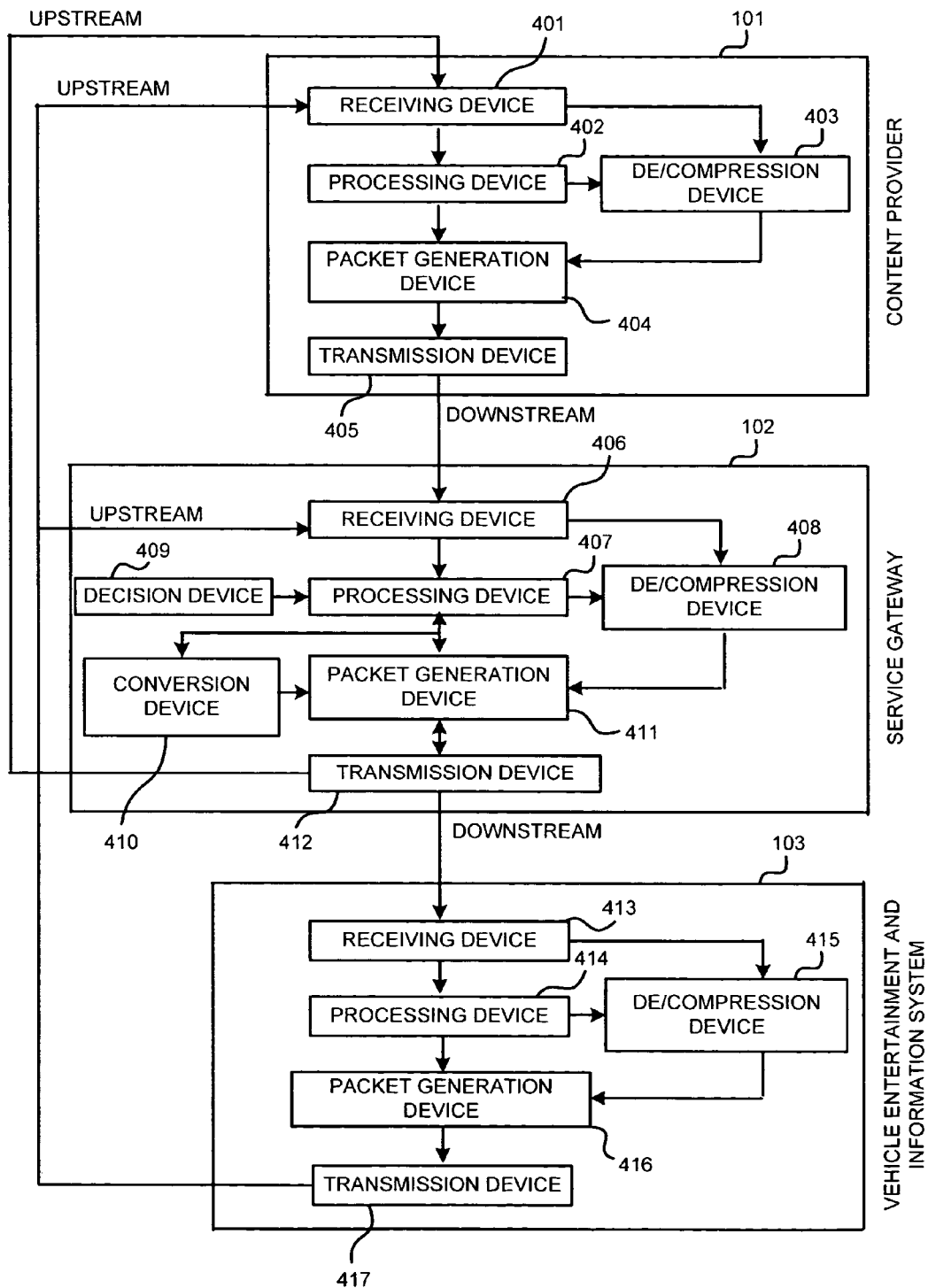
FIG. 4 is an alternative vehicle processing system of FIG. 1.

FIG. 4 is an alternative vehicle processing system. The content provider 101, the service gateway 102, and the entertainment system 103 that form the entities of the system comprise receiving devices 401, 406, and 413, processing devices 402, 407, and 414, decompression/compression devices 403, 408, and 415, packet generation devices 404, 411, and 416, and transmission devices 405, 412, and 417.

The receiving devices 401, 406, and 413, and transmission devices 405, 412, and 417, receive data from and transmit data to other entities of the system, respectively. The decompression/compression devices 403, 408, and 415 provide data compression and decompression. The decompression/compression device 408 in the service gateway 102 may decompress data when compressed downstream data has been received by the receiving device 406. When the downstream data needs to be compressed prior to its transmission to the entertainment system 103, the decompression/compression device 408 may compress the downstream data before it is transmitted to the entertainment system 103. Similar decompression/compression of data may be performed at the content provider 101 and the entertainment system 103. The decompression/compression device 403, 408, and 414 may be capable of tokenizing the upstream and/or downstream data to further reduce the amount of bandwidth needed to store or transmit data.

The processing device 402, 407, and 414 may control and initiate data compression and/or decompression, analyze the data format of the received data packets, instruct the packet generation devices 404, 411, and 416 to form downstream or upstream data packets to be transmitted and/or other functions. The processing device 402, 407, and 414 may further encode downstream and upstream data according to selected data formats. At the service gateway 102, the processing device 407 may use or may further include a conversion device 410 for encoding data. At the content provider 101, the processing device 402 may load one or more databases, fetch data from those databases to provide the requested services, add a MIME type of identifier to the downstream data, or access one or more resources. The processing device 407 may further read the MIME type identifier and instruct the packet generation device 411 to form downstream service packets according to a selected MIME type format. At the entertainment system 103, the processing device 414 may further distribute the received downstream data to other entities within the entertainment system 103, such as a navigation system or a media, such as a storage media that may be a unitary part of or linked to the entertainment system 103.

In FIG. 4, the service gateway 102 may select a format to transmit the downstream data. In this vehicle processing system, the service gateway 102 may include a decision device or application 409 that decides whether to convert the received upstream or downstream data to another data format before transmitting the data to an intended receiver. The decision device 409 may be a sequence of instructions that may be executed by a processor such as a program, an expert system, or a logical device. When a conversion is needed, the processing device 407 may instruct the conversion device 410 to convert the respective data.

Figure 5:
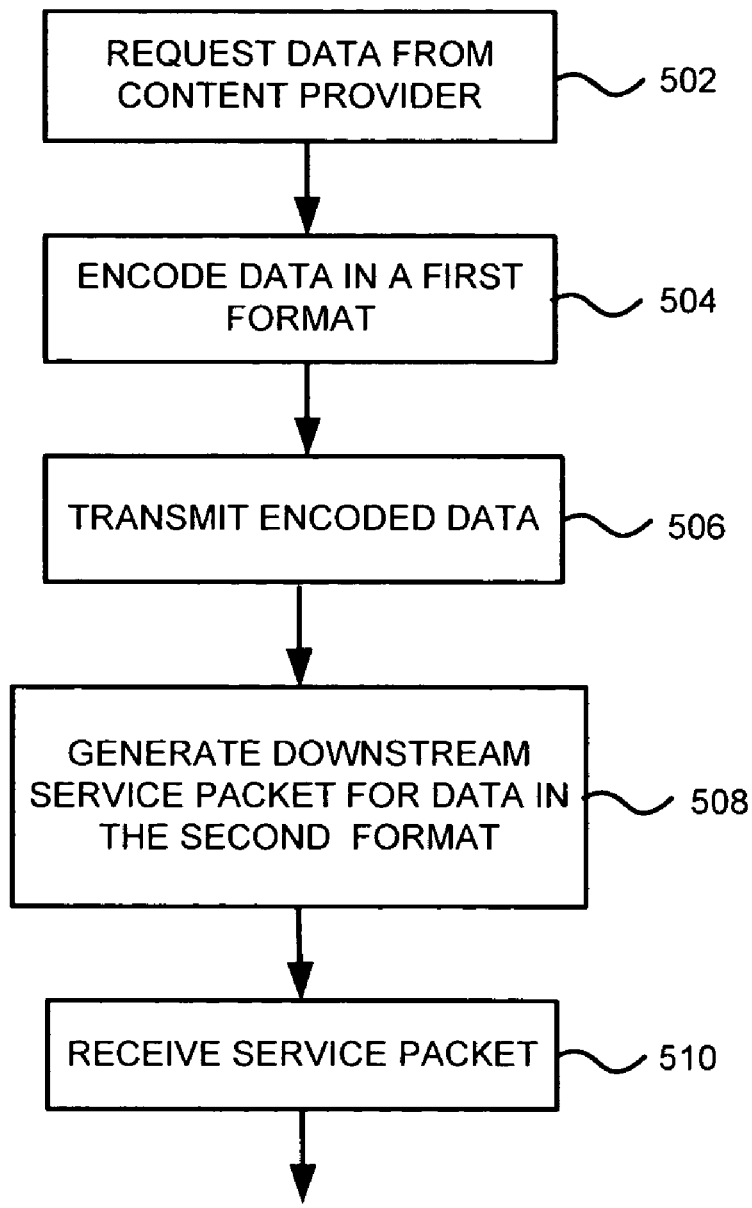
FIG. 5 is a flow diagram of a downstream data flow.

FIG. 5 is a flow diagram of a downstream data flow. The entertainment system 103 requests data from the content provider 101 at 502. The content provider 101 encodes the requested data in a first data format at 504 before transmitting the encoded data at 506 to the service gateway 102. The service gateway 102 then generates a downstream service packet in a second data format at 508 based on the data received from the content provider 101. The service gateway 102 then transmits the downstream service packet to the entertainment system 103.

Figure 6:
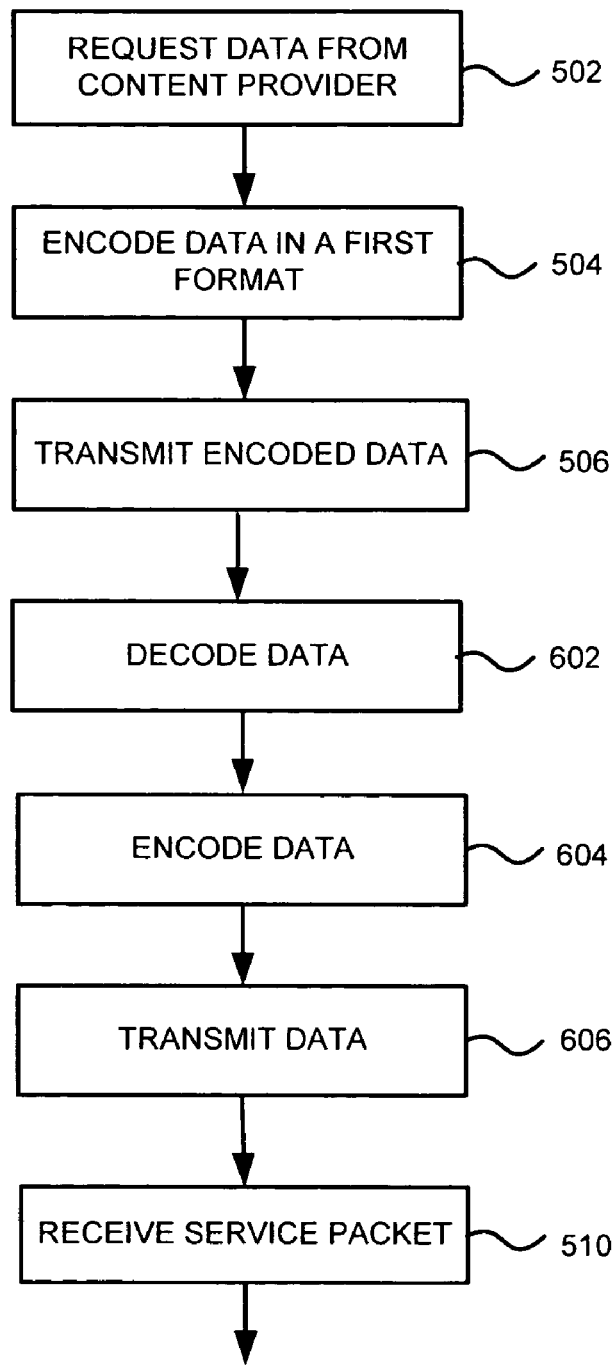
FIG. 6 is a second flow diagram of a downstream data flow.

In FIG. 6, the service gateway 102 may further decode received data at 602, and encode the data of the downstream service packet at 604 in a different data format. At 606, the encoded data is transmitted to the entertainment system 103.

The data formats used by the entertainment system 103 and the service gateway 102 and the content provider 101 may or may not be the same.

Figure 7:
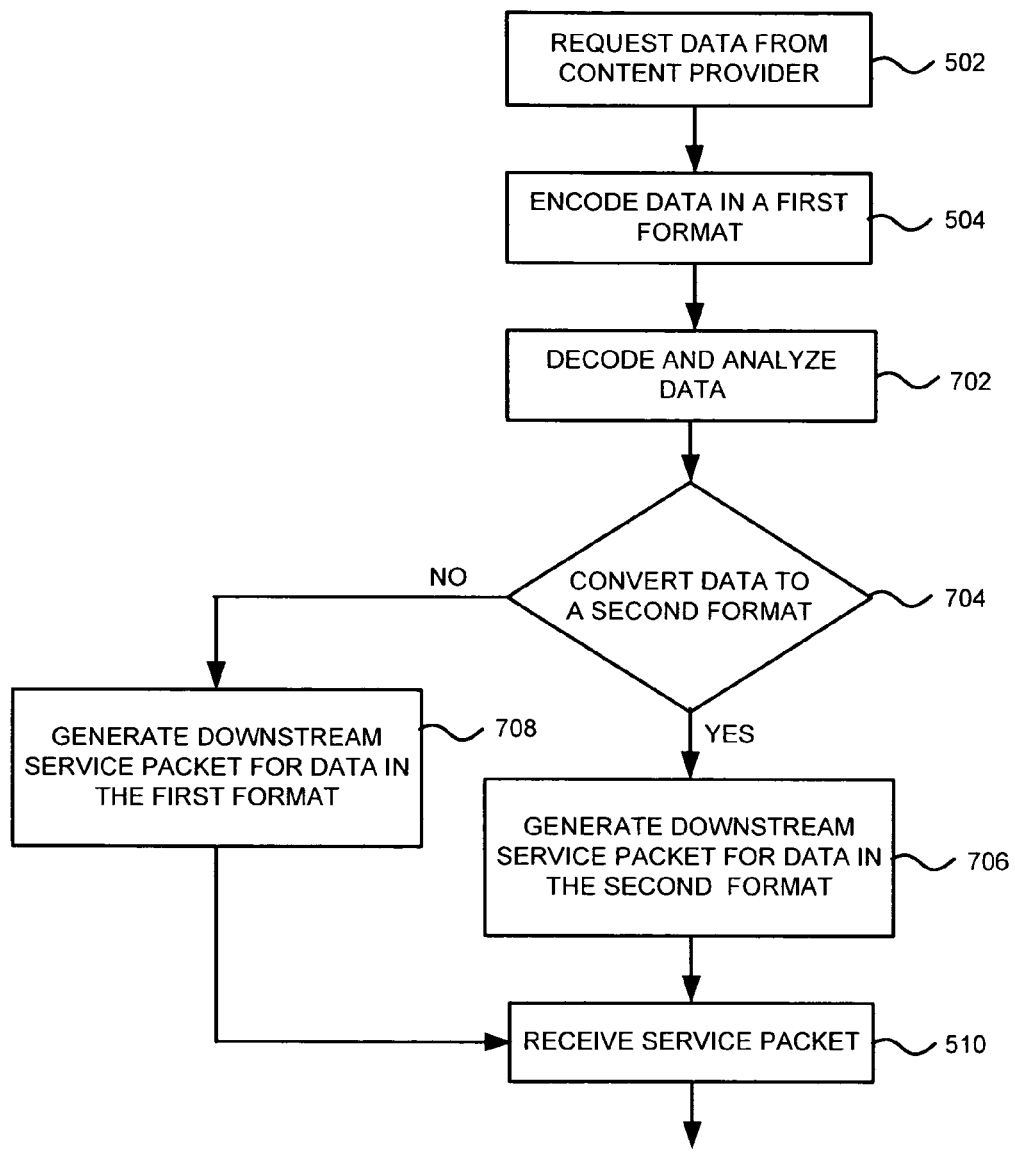
FIG. 7 is a third flow diagram of a downstream data flow.

The service gateway 102 also may decide whether to convert the received content to a form compatible with the entertainment system 103 as shown at 704 and optional 702 of FIG. 7. The service gateway 102 may convert the received data to a second data format at 706 before generating the downstream service packet that is transmitted to the vehicle entertainment system 103. If a conversion is not needed as shown at 708, the service gateway 102 may act as a service bridge that connects the entertainment system 103 to the content provider 101 using the same communication protocol. A conversion decision may be based on an identifier that describes the structure, content, format, or some other property or combination of properties designated by the content provider 101.

Figure 8:
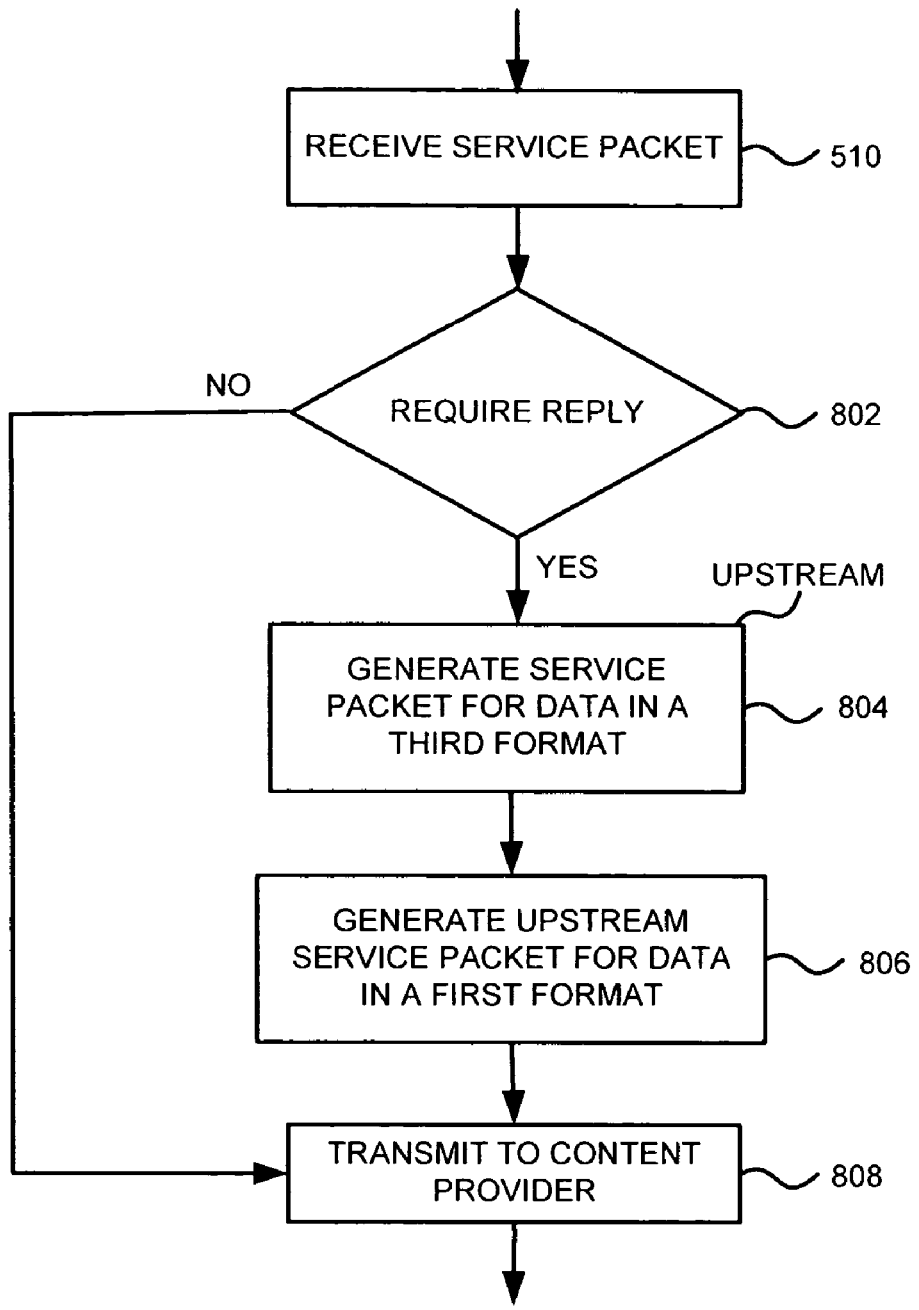
FIG. 8 is a flow diagram of an upstream data flow.
Figure 9:
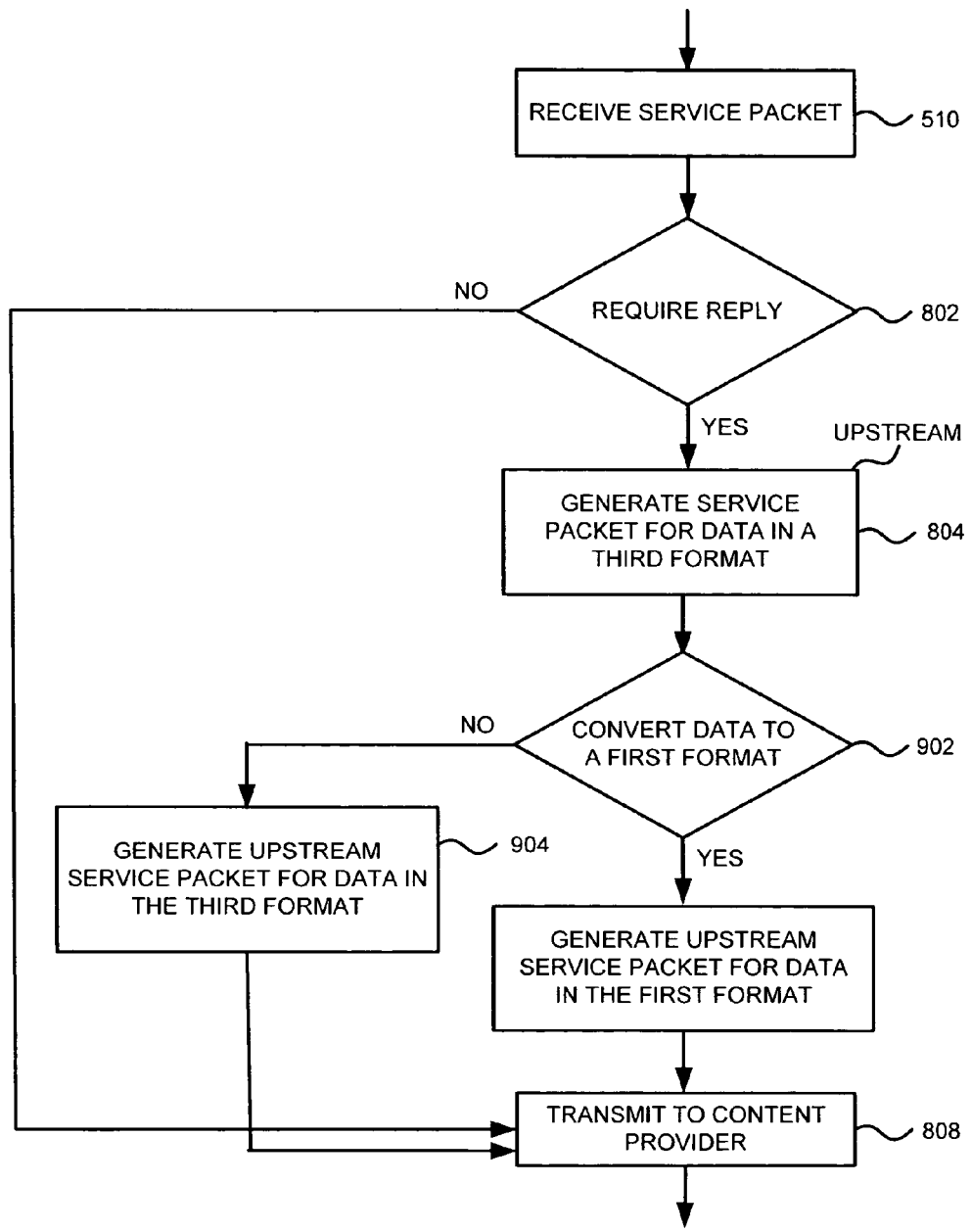
FIG. 9 is a second flow diagram of an upstream data flow.

As the content is delivered to the entertainment system 103, the entertainment system 103 may need to respond to the content provider 101 as shown at 802 of FIG. 8. The entertainment system 103 may generate an upstream service packet according to a third data format at 804 before transmitting the data packet to a service gateway 102. The service gateway 102 may generate one or more data packets in the first data format based on the data contained within the upstream service packet at 806, and may then transmit the generated data packet to the content provider 101 at 808. In FIG. 9, the service gateway 102 may decide whether to convert the upstream service packet to a first data format at 902. Alternatively, the service gateway 102 may transfer the data to the content provider 101 without a conversion at 904. The encoding data at a content provider 101 may comprise compressing the requested data. Further, decompressing the compressed data included in the downstream service packet at the entertainment system may be provided.

Since bandwidth on any communication link such as a wireless link may be limited, data encoding at the content provider 101 may further comprise compressing the requested data. The conversion at the service gateway 102 may comprise decompressing the data received from the content provider 101. Further, the generation of the downstream service packet at the service gateway 102 may include compressing the data to be transmitted to the entertainment system 103. The entertainment system 103 may then restore the data to its original form.

Alternatively, the creation of the downstream service packet at the service gateway 102 may include compressing the data to be transmitted before generating the downstream service packet to be sent to the entertainment system 103. Many data compression methods or algorithms may be used such as ZIP, GZIP, BZIP2, RAR, TAR, and a combination thereof.

As described, the data formats may be based on a markup language. This format may include a content and a structure that represents information. The content may include an eXtensible Markup Language (XML) format, a proprietary Multipurpose Internet Mail Extensions (MIME) format, a Hyper Text Markup Language (HTML) format, a Wireless Markup Language (WML) format, or other proprietary and nonproprietary data formats. In some systems when a compression is used, the tags may be tokenized. Tokenizing may reduce the transmission size of block of data to be stored or transmitted.

Some vehicle processing systems include a service gateway 102 that includes a receiver or transceiver for receiving data from the content provider 101 in one or more data formats. In this system, the service gateway 102 may generate one downstream service packet from the data received from a content provider 101. The downstream service packet may be provided in a second data format. The service gateway 102 may include a transmitter for transmitting the downstream service packet to the entertainment system 103. Some service gateways 103 also may comprise a decision device for deciding whether to convert the received data from the first data format to the second data format or to forward the received data in a form compatible with the receiving device. The decision device also may comprise an expert system or a program adapted to make a decision to convert data to one or multiple data formats that are compatible with the data sent or received from the content provider 101. The receiver also may also receive an upstream service packet according to a third data format from the entertainment system 103.

The content provider 101 may include an encoder that encodes requested data in one or more data formats. The content provider 101 may include packet generator that forms a downstream data packet that includes encoded data and a data format identifier that may specify a data format to be used when processing the data. The content provider 101 may also include a transmitter or transceiver that transmits the downstream data packet to the service gateway 102. The content provider 101 may further include a receiver that receives the data requesting content to be delivered to the entertainment system 103.

The entertainment system 103 may further include an encoder and a decoder. The encoder may comprise a program or device that encodes transmitted data, and optionally, compresses data. The decoder may include a program or device that converts the coded data back to its original form, which may include decompressing the data if the data is received in a compressed format.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for exchanging data between a vehicle entertainment and information system and a content provider comprising:

installing a service gateway that converts a communication protocol;

in response to a data request to the content provider by the vehicle entertainment and information system, forming a downstream service packet identifying a first data format of service data to the data request, the vehicle entertainment and information system which has sent the data request, and content of the service data and including information that associates the service data with the data request;

compressing the downstream service packet to tokenize a tag defined by a markup language into a number where compressing comprises generating a mapping list that maps the number to the tag; and receiving the downstream service packet at the service gateway where the received downstream service packet comprises the mapping list and a tokenized payload;

processing the downstream data format at the service gateway comprising:

converting the downstream data packet to have the second data format upon determination that the second data format is compatible with the vehicle entertainment and information system;

transmitting the downstream service packet having the second data format to the vehicle entertainment and information system;
generating an upstream service packet at the vehicle entertainment and information system, the upstream service packet identifying a selected data format used by the vehicle entertainment and information system, the vehicle entertainment and information system and content of the upstream service packet;
transmitting the upstream data packet to the content provider by the service gateway where the selected data format of the upstream data packet at the interface to the content provider corresponds to the first data format of the downstream data packet; and
where the first data format includes a standard format and the second and the selected data formats include one of the standard format and a proprietary format.

2. The method according to claim 1 further comprising:
decoding the downstream data packet in the first data format which is received from the content provider at the service gateway;
encoding the downstream service packet in the second data format at the service gateway, where the first and the second data formats are different.

3. The method according to claim 1 further comprising detecting a data format identifier embedded in the downstream data packet received from the content provider.

4. The method according to claim 1 where the first data format is based on an eXtensive Markup Language ("XML") and one of the second and the selected data formats includes the proprietary format.

5. The method according to claim 1 where compressing the downstream data packet comprises compressing the downstream data packet exclusively at the service gateway or the content provider.

6. The method according to claim 1 where the second and the selected data formats include a text format.

7. The method according to claim 1 where the downstream data packet comprises a first tag indicative of downstream and the upstream data packet comprises a second tag indicative of upstream where the first tag and the second tag are compressed into the number.

8. A service gateway that exchanges data with a content provider and a vehicle entertainment and information system comprising:
a receiver that receives a first downstream data packet from the content provider,
where in response to a data request from the vehicle entertainment and information system, the first downstream data packet identifies a first data format of service data in response to the data request, the vehicle entertainment and information system which has sent the data request, and content of the service data and includes information that associates the service data with the data request,
where the first downstream data packet comprises a tag which is defined by a markup language and compressed to be tokenized into a number and the first downstream data packet farther comprises a mapping list that maps the number to the tag and a tokenized payload;
a decision device operable to:
detect a data format identifier embedded in the first downstream data packet; and
determine whether the data format identifier represents a compatible format with the vehicle entertainment and information system;
a conversion device operable to convert the first data format of the first downstream data packet according to the second data format in response to the determination that the vehicle entertainment and information system is compatible with the second data format; and
a packet generator operable to generate a second downstream service packet in a second data format subsequent to the conversion of the first downstream data packet where the second data format is compatible with the vehicle entertainment and information system;
a transmitter operable to transmit the first downstream service packet, or alternatively, the second downstream service packet to the vehicle entertainment and information system;
where the receiver receives an upstream service packet according to a third data format, the upstream service packet identifying the third data format used by the vehicle entertainment and information system, the vehicle entertainment and information system, and content of the upstream service packet; and
where the first data format includes a standard format and the second and the third data formats include one of the standard format and a proprietary format; and
where the third data format of the upstream data packet at an interface of the service gateway to the content provider corresponds to the first data format of the downstream data packet.

9. A vehicle data processing system comprising:
a vehicle entertainment and information system operable to:
send a data request to a content provider; and
generate an upstream service packet in response to a request from the content provider where the upstream service packet identifies a selected data format used by the vehicle entertainment and information system, the vehicle entertainment and information system, and content of the upstream service packet;
a client-side service gateway for receiving the requested data from the content provider and for generating and transmitting a downstream service packet to the vehicle entertainment and information system where the service gateway detects different data formats between the content provider and the vehicle entertainment and information system, the different data formats including a first data format being transparent to the vehicle entertainment and information system and a second data format and the selected data format being transparent to the content provider, the client-side service gateway comprising:
a receiver operable to receive the downstream service packet from the content provider in response to the data request and the upstream service packet;
a processor operable to analyze the downstream service packet to determine whether conversion of the different data formats is needed and compress the downstream service packet to tokenize the tag into a number and the downstream service packet further comprises a mapping list that maps the number to the tag and a tokenized payload;
a packet generator that generates a resulting downstream service packet subsequent to the determination by the processor as to whether or not the conversion of the different data formats is needed; and
a transmitter that transmits the resulting downstream service packet to the vehicle entertainment and information system;
where the downstream service packet identifies the first data format, the vehicle entertainment and information system which has sent the data request, a selected session, content of service data in response to the data request, information that associates the data request with the service data;

where the first data format includes a standard format and the second and the selected data formats include one of the standard format and a proprietary format;

where the selected data format of the upstream service packet at an interface to the content provider corresponds to the first data format of the downstream data packet.

10. The vehicle processing system according to claim 9 where the service gateway forwards the downstream service packet received from the content provider to the vehicle entertainment and information system when no format differences are detected.

11. The vehicle processing system according to claim 9, where the processor is operable to compress the tag into the number exclusively at the service gateway.

12. The vehicle processing system according to claim 9, where the data request comprises a destination for a navigation service and the downstream service packet further comprises a start mode tag indicative of an immediate start of the navigation service, a save mode tag indicative of storing the destination, and a destination tag indicative of destination information.

13. The vehicle processing system according to claim 9, where the first data format comprises an eXtended Markup Language ("XML") and the processor generates no error when the tag is not correctly construed, thereby preventing service disruption.

14. The vehicle processing system according to claim 13, where the start mode tag, the save mode tag and the destination tag are tokenized into the number.

* * * * *

UNITED STATES PATENT AND TRADEMARK OFFICE
CERTIFICATE OF CORRECTION

| | |
|---|---|
| PATENT NO. | : 7,577,740 B2 |
| APPLICATION NO. | : 10/841103 |
| DATED | : August 18, 2009 |
| INVENTOR(S) | : Kühn et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

Signed and Sealed this

Seventh Day of September, 2010

David J. Kappos
*Director of the United States Patent and Trademark Office*